(12) United States Patent
Sayers

(10) Patent No.: US 8,793,587 B2
(45) Date of Patent: Jul. 29, 2014

(54) INTERACTIVE DISPLAY OF DATA CENTER ASSETS

(75) Inventor: Craig Peter Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2529 days.

(21) Appl. No.: 11/171,586

(22) Filed: Jun. 29, 2005

(65) Prior Publication Data

US 2007/0005382 A1  Jan. 4, 2007

(51) Int. Cl.
*G06F 3/00* (2006.01)

(52) U.S. Cl.
USPC .......................................................... 715/738

(58) Field of Classification Search
CPC ...................................................... G06Q 10/06
USPC .......................................................... 715/738

See application file for complete search history.

(56) References Cited

U.S. PATENT DOCUMENTS

| 5,434,775 | A | * | 7/1995 | Sims et al. | 705/8 |
| 5,884,298 | A | * | 3/1999 | Smith et al. | 707/2 |
| 6,148,291 | A | * | 11/2000 | Radican | 705/28 |
| 6,285,967 | B1 | * | 9/2001 | Rajan et al. | 702/188 |
| 2006/0218510 | A1 | * | 9/2006 | Ward | 715/853 |
| 2006/0241907 | A1 | * | 10/2006 | Armstrong et al. | 702/182 |

* cited by examiner

*Primary Examiner* — William Bashore
*Assistant Examiner* — Henry Orr

(57) ABSTRACT

Interactively displaying assets in a data center. Data describing locations over time for the assets in the data center is accessed. Asset location is displayed in a graphical user interface (GUI). The asset location comprises a view of a rack in the data center. Also displayed in the GUI is an asset history related to the rack. At least one of the displaying asset location and the displaying the asset history is responsive to user selection of an element in the GUI.

21 Claims, 8 Drawing Sheets

INTERACTIVE DISPLAY OF DATA CENTER ASSETS

BACKGROUND OF THE INVENTION

1. Field of the Invention

Embodiments of the present invention generally relates to tracking electronic devices. More particularly, embodiments of the present invention relate to a graphical user interface that interactively displays electronic device tracking data.

2. Background

Electronic devices such as computer servers, communications devices (e.g., network interface cards), disk drives, and the like are often housed within cabinets or racks of a building or a data center. The racks typically have a number of bays or slots, each or which may house one or more electronic devices. Typically, the racks are arranged side-by-side in rows. An example of a rack may be defined as an Electronic Industry Association (EIA) enclosure and typically includes a plurality of open bays.

Data centers may have hundreds of racks and thousands of electronic devices, many of which appear almost identical. Furthermore, the devices may be moved in the data center and electronic devices may be added or removed from the data center.

When an electronic device is moved or misplaced, finding it again is non-trivial. Also, properly locating an electronic device that needs replacement is non-trivial. For example, if a failing device needs replacement, it is critical that the correct device be located. Given the similarity of the devices, it is difficult to locate the correct device.

SUMMARY OF THE INVENTION

A method of interactively displaying assets in a data center is disclosed. In an embodiment, data describing locations over time for the assets in the data center is accessed. Asset location is displayed in a graphical user interface (GUI). The asset location comprises a view of a rack in the data center. Also displayed in the GUI is an asset history related to the rack. At least one of the displaying asset location and the displaying the asset history is responsive to user selection of an element in the GUI.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Embodiments of the present invention provide a graphical user interface (GUI) that facilitates visualizing of datacenter assets (e.g., electronic devices within racks). This allows a user to quickly and precisely locate an asset in the data center. Embodiments of the present invention provide for unique views of the datacenter assets that help to orient the user such that the location of assets is easily visualized. Embodiments of the present invention allow a user to quickly visualize an asset's location for a selected time period.

Figure 1A:
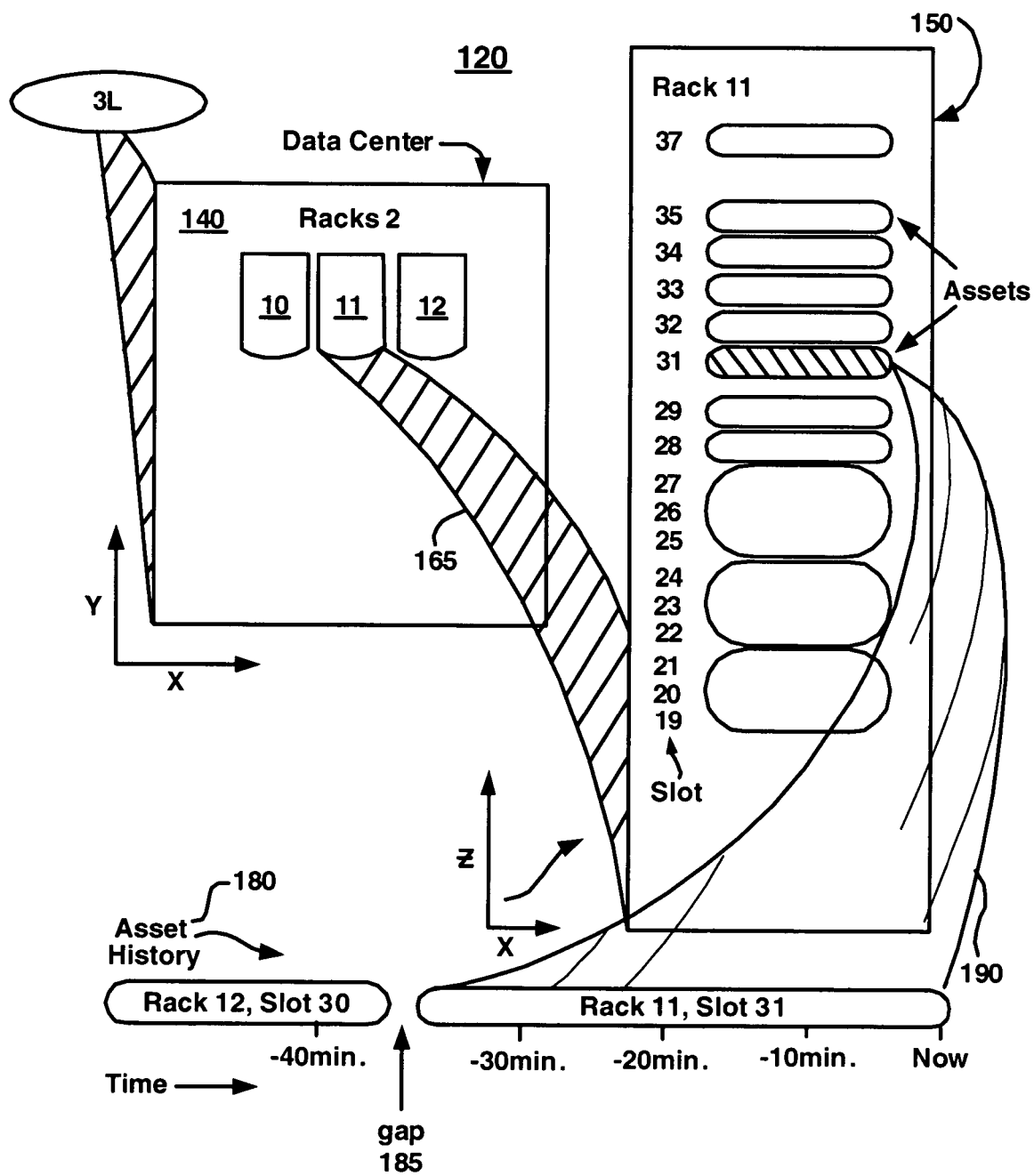
FIG. 1A is a diagram illustrating a graphical user interface showing a location history for an electronic device to help visualize data center assets in accordance with an embodiment of the present invention.

FIG. 1A is a diagram illustrating a graphical user interface 120 (GUI) that includes a location history for a data center asset (e.g., electronic device) in accordance with an embodiment of the present invention. The GUI 120 is interactive in that a user may select a data center, rack, asset, time period, etc. by clicking an icon or the like in the GUI 120. Responsive to the user selection, data center assets are presented in a way that facilitates visualizing the location of assets.

In the example of FIG. 1A, the user has selected a data center "3L", which comprises a number of racks. The GUI 120 displays a top view 140 of the racks (10, 11, 12) such that the user sees a two-dimensional view, in this embodiment. Herein, the two dimensions will be defined by the depicted "x" and "y" axes. In a typical datacenter, there may be hundreds of racks; however, for clarity only a single row of three racks is depicted in FIG. 1A. The top view 140 allows for quick and easy visualization of the "x" and "y" coordinates of any asset in the datacenter.

The user has selected rack "11," wherein a front view 150 of rack 11 is displayed, such that the user sees a two-dimensional view, in this embodiment. Herein, the two dimensions will be defined by the depicted "x" and "z" axes. The front view 150 allows quick and easy visualization of the "z" coordinate location of any asset in the datacenter. Further, the front view 150 shows the positions and relative sizes of the assets (e.g., electronic devices) in the rack. While a single column of assets is depicted, the rack may have any number of columns. The combination of the front view 150 and the top view 140, quickly and easily visualizes the "x", "y", and "z" coordinate of an asset. To facilitate this visualization, there is a graphical linking 165 from rack 11 in the top view 140 to the front view

150. More particularly, the linking 165 is from an "x" axis side of rack 11 in the top view 140 to an "x" axis side of rack 11 in the front view 150.

FIG. 1A also displays an asset history 180 related to the selected rack 11. In particular, the asset history 180 is for the asset that currently resides in slot 31 of rack 11, in this example. The asset history 180 describes the rack and slot location of the asset over time, in this embodiment. The selected asset is highlighted in the front view 150 in one embodiment. To help orient the user to the linkage from the time dimension to the asset location, the GUI 120 has a graphical linkage 190 from a region of the asset history 180 to the location of the asset.

In one embodiment, the asset history 180 is displayed in response to user selection of one of the assets in a rack. The areas of the asset history that are unbroken indicate periods of time for which the asset did not move (e.g., its state was constant). The gaps in the asset history 180 indicate a period of time for which the asset was not in a slot in any of the racks. Thus, the brief gap 185 in the asset history 180 of FIG. 1A may correspond to the time when the asset was moved from one slot to another.

Figure 1B:
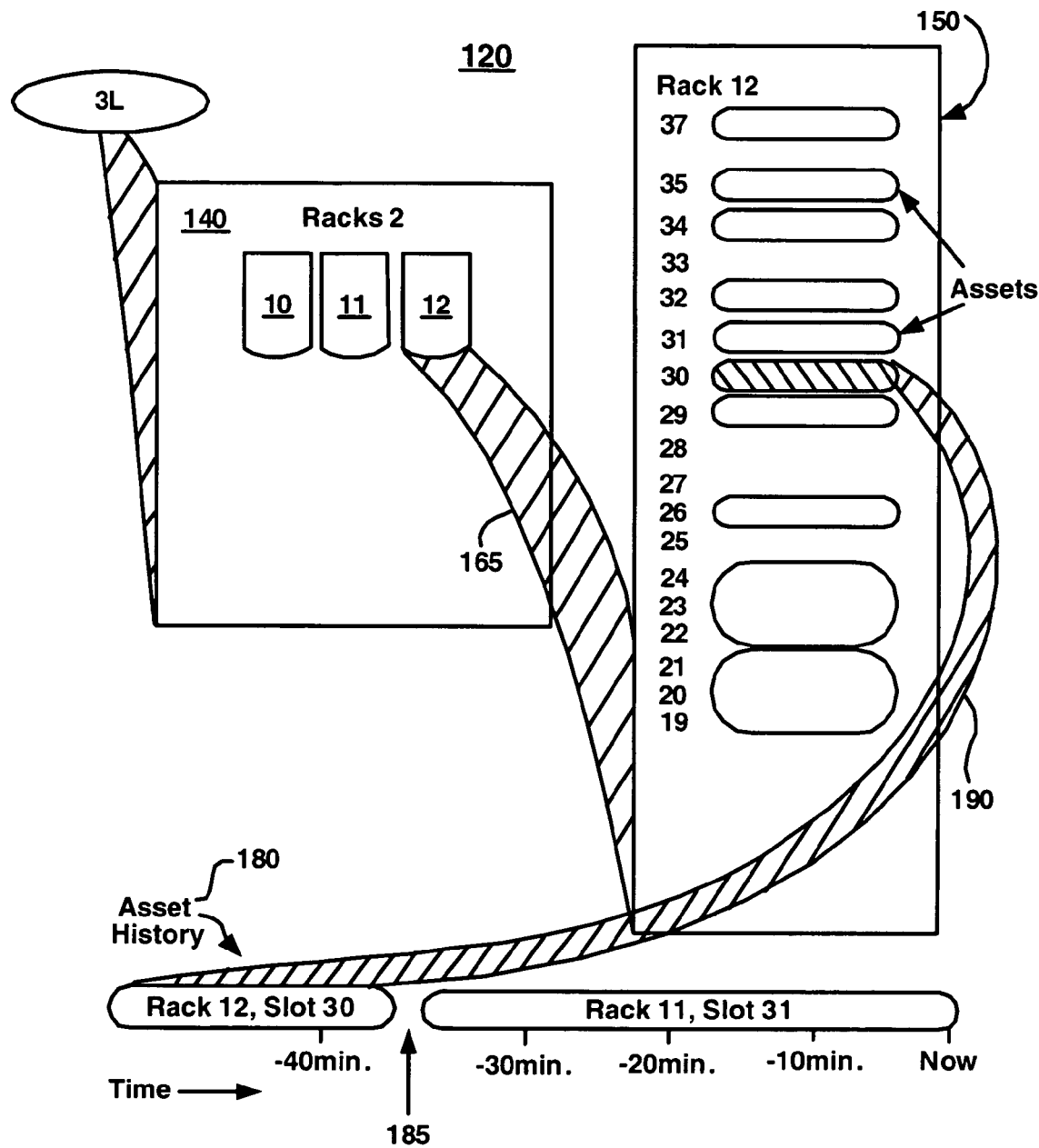
FIG. 1B is a diagram illustrating a graphical user interface showing a location history for an electronic device to help visualize data center assets in accordance with an embodiment of the present invention.

In accordance with one embodiment of the present invention, the user may select a region of the asset history 180 to visualize the location of the asset at the selected time period. Referring now to FIG. 1B, responsive to user selection of the region of the asset history 180 near "−40 minutes," the GUI displays rack 12. In one embodiment, a graphical linkage 190 is provided from the selected time period to the asset location (e.g., rack 12, slot 30). Thus, the user can quickly visualize the location history of an asset by selecting a region of the asset history. In one embodiment, the length of the asset history may be expanded to show additional history.

At any time, the user may select a different asset in the currently displayed front view 150 to view the location history of the selected asset. Furthermore, the user may select a different rack in the currently displayed top view 140 or a different data center to view the location history of assets in other racks or data centers.

Figure 2A:
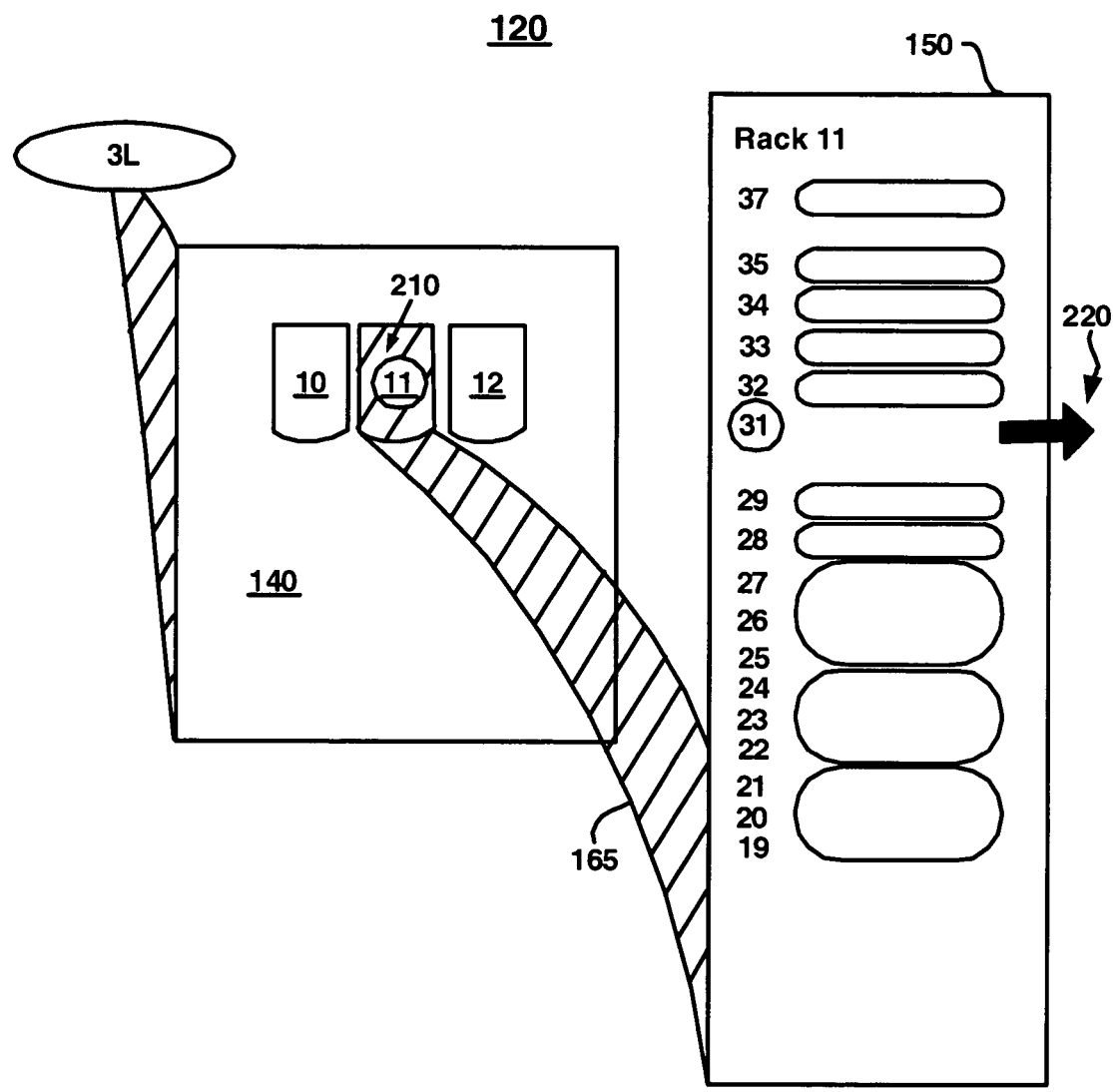
FIG. 2A is a diagram illustrating a graphical user interface showing a warning to help visualize movement to data center assets in accordance with an embodiment of the present invention.

An embodiment of the present invention alerts the user of a change (or a potential change) to asset location. FIG. 2A is a diagram illustrating a GUI showing multiple warning indicators to help visualize data center assets in accordance with an embodiment of the present invention. The top view 140 has a warning indicator 210 associated with rack 11, indicating a change has occurred to that rack. In the front view 150, the right arrow warning indicator 220 indicates that an asset has recently been removed from slot 31. In accordance with one embodiment, a left arrow (not depicted in FIG. 2A) is used to indicate an asset has recently been added to a slot. Other types of warning indicators may be used. The warning indicators may persist for any desired time. In one embodiment, the warning is displayed for about 30 minutes. In another embodiment, the warning indicator fades out over time to indicate the age of the warning.

Figure 2B:
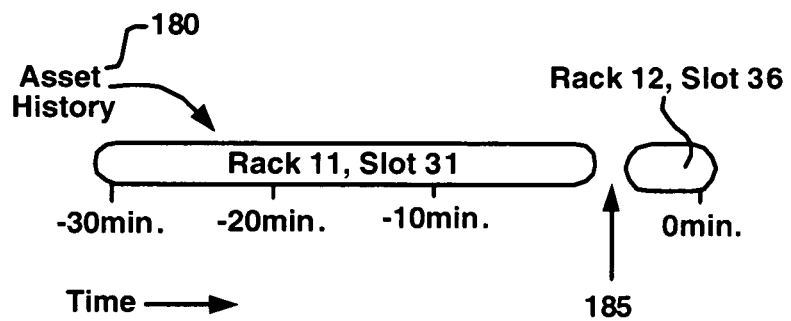
FIG. 2B is a diagram illustrating a graphical user interface that facilitates visualizing movement of a data center asset in accordance with an embodiment of the present invention.

In response to the user selecting a warning indicator the recent history of the last asset in the changed slot is displayed, in accordance with an embodiment of the present invention. FIG. 2B depicts an exemplary asset history 180, which may be displayed along with a front view of a rack and top view of racks in a data center (not depicted in FIG. 2B). The asset history 180 shows that the asset was in the changed slot (rack 11, slot 31) up until a few minutes prior to the current time. Further, the current location of the moved asset is indicated in the most recent (e.g., rightmost) portion of the asset history as rack 12, slot 36. The user can select this most recent region of the timeline to display the asset's current location (not depicted in FIG. 2B). The asset's current location may be depicted by a GUI such as depicted in FIG. 1A or FIG. 1B. Moreover, the asset history can be expanded to see a longer history.

Figure 3:
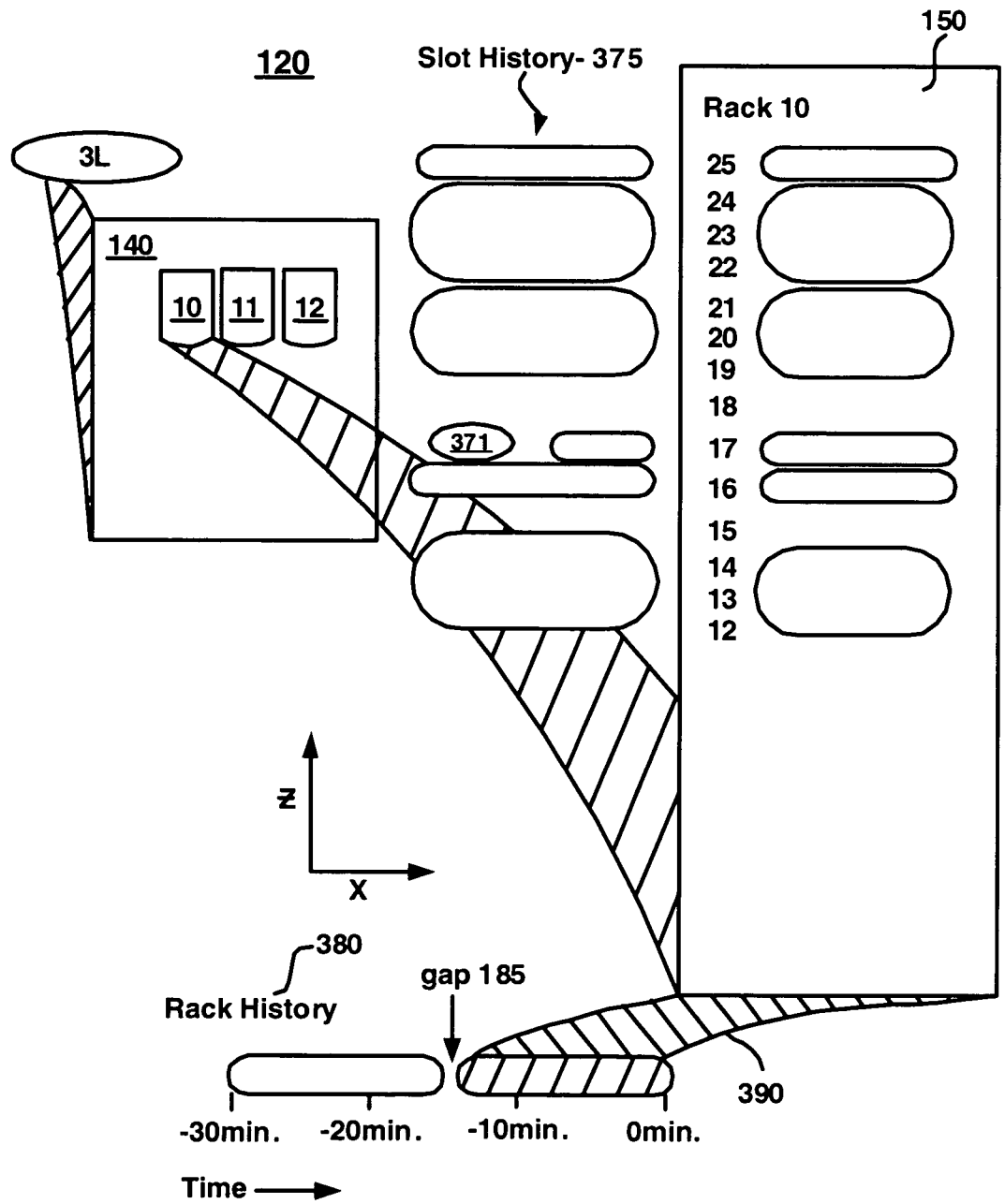
FIG. 3 is a diagram illustrating a graphical user interface showing asset history for a rack to help visualize data center assets in accordance with an embodiment of the present invention.

An embodiment of the present invention displays a history of assets in a rack. For example, in response to receiving a selection of one of the racks in the top view 140, a graphical user interface showing a slot history 375 and a rack history 380 is displayed, as depicted in FIG. 3, in accordance with an embodiment of the present invention. Rack 10 has been selected, wherein the GUI 120 shows a slot history 375 showing the history of each slot in rack 10, along with the front view 150 of rack 10. Continuous sections in the slot history 375 indicate times for which the assets are consistent. The slot history 375 indicates that an asset was recently added to slot 17.

Still referring to FIG. 3, the rack history 380 at the bottom indicates the status for the rack as a whole. A gap 185 may indicate that the rack door was open, and thus the contents were potentially changed. In this case, the gap 185 is due to the asset added to slot 17. The user may select any region of the rack history 380 to cause the slot history 375 to display the selected time period. For example, were the time period that includes "−20" minutes selected, the rack contents that is displayed in the front view 150 would be empty for slot 17. The front view 150 of the rack defaults to the present time period, in one embodiment. The GUI 120 has a graphical linkage 390 from a region of the rack history 380 to the front view 150 of rack 10 and a graphical linkage 165 from the front view 150 to the top view 140 to facilitate visualizing the location of assets.

In addition, clicking on particular a server in the slot history 375 allows a user to visualize a history for that server, similar to the history in FIG. 1B. For example, clicking on server 321 will bring up a GUI displaying where the server 321 was located in slot 17 of rack 10 during the period of time. A location history will also be displayed.

In one embodiment in accordance with the present invention, temperature information (not depicted in FIG. 3) is overlaid on the slot history 375 to indicate changes in temperature over time. One embodiment displays temperature data for the "z" axis over time. The temperature information may be displayed by associating colors with temperature, for example. The temperature history information can be very useful to understand the affect of moving or changing a parameter of one or more assets.

Figure 4:
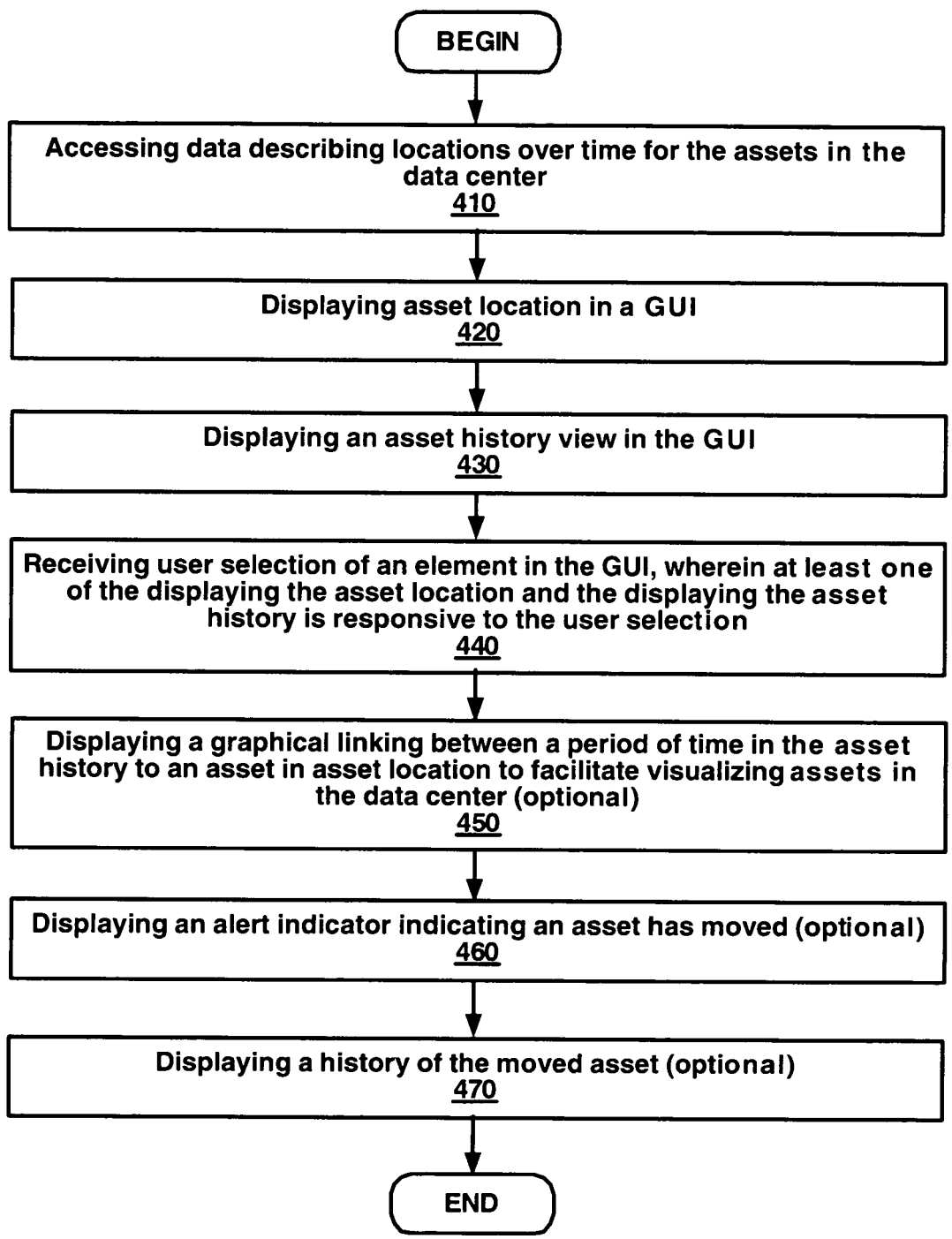
FIG. 4 is a flowchart illustrating steps of a process of interactively displaying assets in a data center in accordance with an embodiment of the present invention.

FIG. 4 is a flowchart illustrating steps of a process 400 of visualizing assets (e.g., electronic devices) in a data center in accordance with an embodiment of the present invention. The assets may include servers, electronic data storage devices, network interface cards, etc. Steps of process 400 may be stored as instructions on a computer readable medium and executed on a processor. In one embodiment, a client node executes a program that displays a GUI for visualizing data center assets.

Step 410 comprises accessing data describing locations over time for the assets in the data center. In one embodiment, the data is accessed by a client node accessing a web server, which in turn accesses a database that stores data center asset information. The data for the database may be collected in any convenient manner. In one embodiment, the data is collected from the data center by equipping the assets with tracking tags (e.g., RFID tags or the like) and placing reading devices nearby (e.g., at strategic locations on the rack). A method of tracking electronic devices that are equipped with tracking tags is described in U.S. Pat. No. 6,796,506 to Pradhan; however, the present invention is not limited to that method of collecting the data.

Step 420 comprises displaying asset location in a GUI. The asset location may comprise a top view of a plurality of racks in the data center and a front view of a rack of the plurality of racks. In one embodiment, the top view comprises an "x" dimension and a "y" dimension. In one embodiment, the front view comprises an "x" dimension and a "z" dimension. One embodiment comprises graphically linking the "x" dimension from the top view to the front view to facilitate orienting a user to viewing the assets. Therefore, visualization of an asset in a three dimensional coordinate system is provided.

Step 430 comprises displaying an asset history view in the GUI. In accordance with one embodiment, the asset history view comprises a history of assets present in slots of the rack. In accordance with one embodiment, the asset history view comprises a location history of an asset associated with a slot of a rack. The asset history may comprise regions of continuous sections representing periods in which asset location is fixed (e.g., its status is unchanged) and a gap representing a change in asset location.

Step 440 comprises receiving user selection of an element in the GUI. In accordance with one embodiment, the displaying the asset history is responsive to a user selection of an asset in the asset location. For example, the user selects an asset displayed in the front view of a rack to cause the history of the selected asset to be displayed. In accordance with one embodiment, the displaying of the asset location is responsive to user selection of a time period (e.g., state) of the asset history.

Step 450 comprises the optional step of displaying a graphical linking between a period of time or state in the asset history view to an asset in the front view of the rack to facilitate visualizing assets in the data center.

Step 460 comprises the optional step of displaying an alert indicator indicating an asset has moved. The movement may be an asset added to or removed from a slot. The movement may also be an entire rack being added to or removed from the data center, or moved within the data center.

Step 470 comprises displaying a history of the moved asset responsive to user selection of the alert indicator in step 460.

Figure 5:
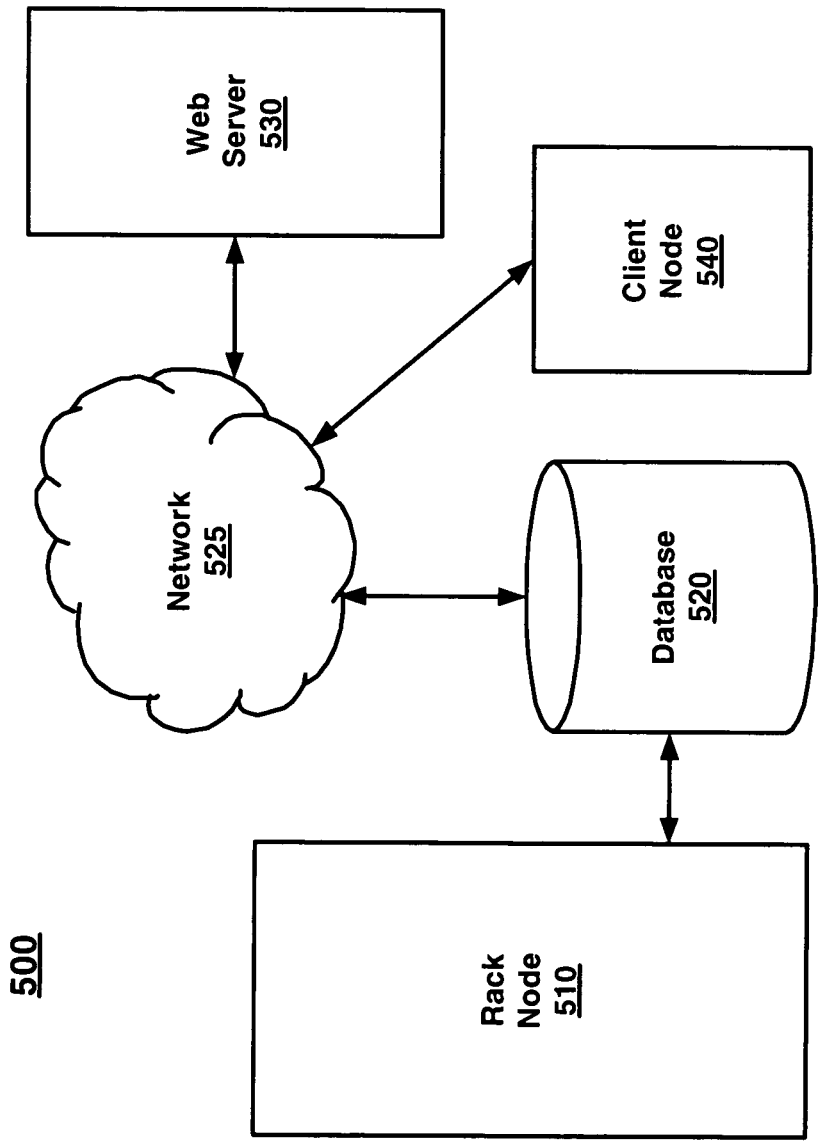
FIG. 5 is a diagram of a system for visualizing data center assets, in accordance with an embodiment of the present invention.

FIG. 5 is a diagram of a system for visualizing data center assets, in accordance with an embodiment of the present invention. The rack node 510 is able to determine its assets (e,g., servers, network cards, electronic devices, etc.) and asset locations (e.g., slots, bays, etc.), this embodiment. The rack node 510 sends changes to the database 520. The changes may be sent periodically or responsive to an event, such as a door opening or closing.

A graphical user interface for visualizing data center assets is displayed at the client node 540. When the client node 540 requests a new visualization from the web server 530 via the network (e.g., Internet) 525, the web server 530 queries the database 520 to construct the new visualization. The web server 530 sends the new visualization to the client node 540. In one embodiment, the web server 530 sends a web page with embedded code. In one embodiment, the embedded code comprises embedded JavaScript™. In one embodiment, the web page graphics are encoded with Scalable Vector Graphics (SVG). Periodically, the embedded code in the web page on the client node 540 requests an update from the web server 530, wherein the web server 530 provides an updated visualization.

Figure 6:
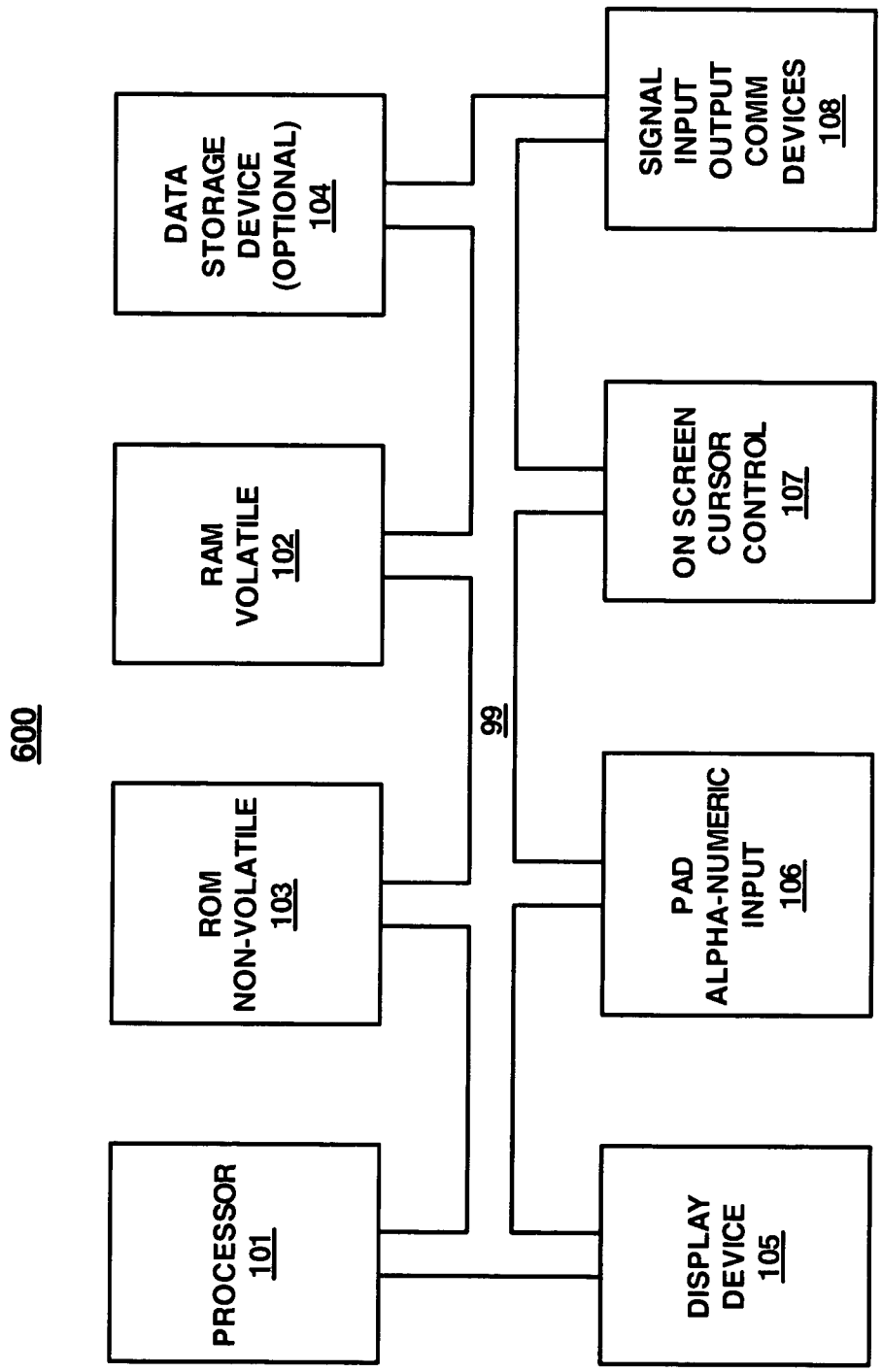
FIG. 6 is an exemplary computer system that may serve as a platform for embodiments of the present invention.

With reference now to FIG. 6, portions of embodiments of the present invention are comprised of computer-readable and computer-executable instructions that reside, for example, in computer-usable media of a computer system. FIG. 6 illustrates an exemplary computer system 600 used to perform a method in accordance with embodiments of the present invention. It is appreciated that system 600 of FIG. 6 is exemplary only in that embodiments of the present invention can operate within a number of different computer systems including general purpose networked computer systems, embedded computer systems, and stand alone computer systems. Additionally, computer system 600 of FIG. 6 is well adapted to having computer readable media such as, for example, a floppy disk, a compact disc, and the like coupled thereto. Furthermore, the computer readable media may be a carrier wave or the like. Such computer readable media is not shown coupled to computer system 600 in FIG. 6 for purposes of clarity.

System 600 of FIG. 6 includes an address/data bus 99 for communicating information, and a central processor unit 101 coupled to bus 99 for processing information and instructions. System 600 also includes data storage features such as a computer usable volatile memory 102, e.g., random access memory (RAM), coupled to bus 99 for storing information and instructions for central processor unit 101, computer usable non-volatile memory 103, e.g. read only memory (ROM), coupled to bus 99 for storing static information and instructions for the central processor unit 101, and an optional data storage unit 104 (e.g., a magnetic or optical disk and disk drive) coupled to bus 99 for storing information and instructions.

With reference still to FIG. 6, system 600 of embodiments of the present invention also includes an optional alphanumeric input device 106 including alphanumeric and function keys is coupled to bus 99 for communicating information and command selections to central processor unit 101. System 600 of the present embodiment also includes a display device 105 coupled to bus 99 for displaying information. The GUI 120 may be displayed on display device 105, in accordance with embodiments of the present invention. System 600 also includes a cursor control device 107 coupled to bus 99 for communicating user input information and command selections to central processor unit 101. In one embodiment, the user selects an element in the GUI with on screen cursor control 107. Signal input/output communication device(s) 108 coupled to bus 99 is connected to a network (e.g., network 120) and controls the flow of information over the network.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method of interactively displaying assets in a data center, said method comprising:

accessing data describing locations over time for said assets in said data center, wherein each asset of said assets is an electronic device within a rack of said data center;

displaying an asset location in a graphical user interface (GUI), wherein said asset location comprises a front view of a rack located in said data center and a top view of a plurality of racks located in said data center; and displaying in said GUI an asset history related to said rack, wherein at least one of said displaying said asset location and said displaying said asset history is responsive to user selection of an element in said GUI, and wherein said displaying said asset history related to said rack comprises displaying a location history of an asset in said rack.

2. A computer-implemented method as recited in claim 1, further comprising receiving user input indicating selection of a region of said location history, wherein said displaying the rack view is responsive to said user selection of said region.

3. A computer-implemented method as recited in claim 1, further comprising receiving user input indicating selection of the asset in said rack view, wherein said displaying the location history is responsive to said user selection of the asset.

4. A computer-implemented method as recited in claim 1, wherein said displaying the asset history related to said rack comprises displaying a history of assets present in slots of said rack.

5. A computer-implemented method as recited in claim 1, further comprising:
displaying an alert indicator indicating an asset has moved; and
wherein said displaying the asset history comprises displaying a location history of said moved asset in response to user selection of said alert indicator.

6. A computer-implemented method as recited in claim 1, wherein said asset history comprises continuous sections representing periods in which asset location is fixed and a gap representing a change in asset location.

7. A computer readable storage medium having stored therein instructions for implementing a method of interactively displaying assets in data center, said method comprising:
accessing data describing a location over time for said assets in said data center, wherein each asset of said assets is an electronic device within a rack of said data center;
displaying an asset location in a graphical user interface (GUI), wherein said asset location comprises a top view of a plurality of racks in said data center and a front view of a rack of said plurality of racks;
displaying an asset history view in said GUI, wherein said asset history view comprises either an asset history of slots in said rack or a location history of an asset associated with a slot of said rack; and
receiving user selection of an element in said GUI, wherein at least one of said displaying said view of said plurality of racks and said view of said rack of said plurality of racks and said displaying said asset history view is responsive to said user selection.

8. The method as recited in claim 7, wherein said receiving said user selection of said method comprises receiving a selection of an asset in said view of a plurality of racks in said data center and said view of said rack of said plurality of racks, and wherein said displaying the asset history view comprises displaying said location history of the asset.

9. The method as recited in claim 7, wherein said receiving said user selection of said method comprises receiving a selection of a region of said location history corresponding to a period of time and wherein said displaying said asset location comprises displaying a rack in which said asset was located for said period of time.

10. The method as recited in claim 7, wherein said method further comprises displaying a graphical linking between a time period in said asset history view to an asset in said asset location to facilitate visualization of assets in said data center.

11. The method as recited in claim 7, wherein said displaying asset location of said method further comprises displaying an alert indicator indicating movement of an asset; and
wherein said displaying the asset history view comprises displaying the location history said asset responsive to user selection of said alert indicator.

12. The method as recited in claim 7, wherein said method further comprises graphically linking said view of the plurality of racks to said view of the rack to facilitate visualization of assets in said data center.

13. A computer-implemented method of displaying assets in a data center, said method comprising:
accessing data describing location over time for said assets in said data center, wherein each asset of said assets is an electronic device within a rack of said data center;
displaying in a graphical user interface (GUI) said assets in a plurality of views comprises a top view of a plurality of racks and a single view of a rack of said plurality of racks in a "x" dimension and a "z" dimension; and
displaying in said GUI an asset history view comprising one of an asset history of slots of said rack or a location history of an asset associated with said rack, wherein at least one of said displaying the front view of the rack and said displaying the asset history view is responsive to user selection of an element in said GUI.

14. The computer-implemented method as recited in claim 13, further comprising displaying a graphical linking between a period of time in said asset history view to an asset in said front view of the rack to facilitate visualizing assets in said data center.

15. The computer-implemented method as recited in claim 13, wherein said top view comprises an "x" dimension and a "y" dimension, and wherein a front view comprises said "x" dimension and a "z" dimension, wherein a visualization of an asset in a three dimensional coordinate system is provided.

16. The computer-implemented method as recited in claim 15, further comprising graphically linking said "x" dimension from said top view to said front view to facilitate orienting a user to viewing said assets.

17. The computer-implemented method as recited in claim 13, wherein said assets comprise servers.

18. The computer-implemented method as recited in claim 13, wherein said assets comprise electronic data storage devices.

19. The computer-implemented method as recited in claim 13, wherein said assets comprise network interface cards.

20. The computer-implemented method as recited in claim 13, further comprising overlaying temperature history onto said asset history view.

21. The computer-implemented method as recited in claim 13, wherein said accessing data comprises a client node accessing a web server.

* * * * *